J. T. KENNEDY.
NUT LOCK.
APPLICATION FILED AUG. 4, 1916.

1,212,361.

Patented Jan. 16, 1917.

Inventor
J. T. Kennedy,

Witnesses

By
Attorney

UNITED STATES PATENT OFFICE.

JOHN T. KENNEDY, OF SOLDIER CITY, KANSAS.

NUT-LOCK.

1,212,361. Specification of Letters Patent. Patented Jan. 16, 1917.

Application filed August 4, 1916. Serial No. 113,142.

*To all whom it may concern:*

Be it known that I, JOHN T. KENNEDY, a citizen of the United States, residing at Soldier City, in the county of Jackson and State of Kansas, have invented certain new and useful Improvements in Nut-Locks; and I do hereby declare the following to be a full, clear, and exact description of the invention, such as will enable others skilled in the art to which it appertains to make and use the same.

This invention relates to nut locks, and the primary object of the invention is to provide a nut having a sleeve extending therefrom for receiving a section of the threaded portion of a bolt, and to provide a transversely extending opening through the nut and bolt, for receiving a locking pin for locking the nut against rotation upon the bolt.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
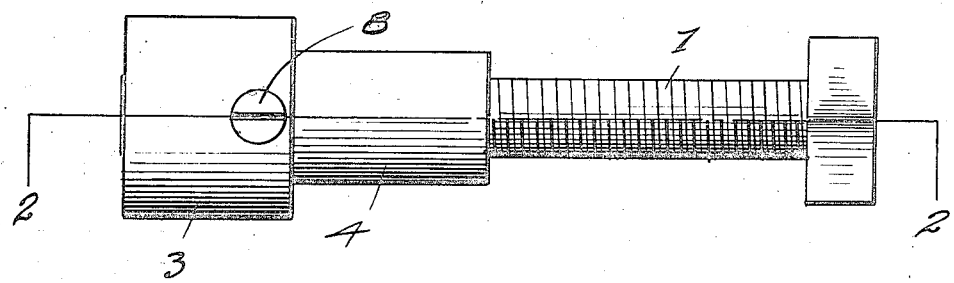
Figure 2:
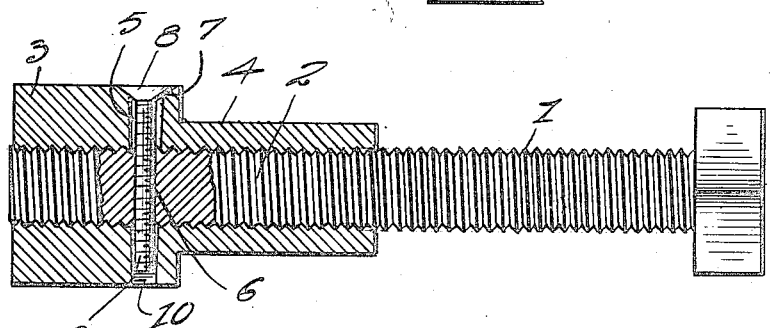
Figure 3:
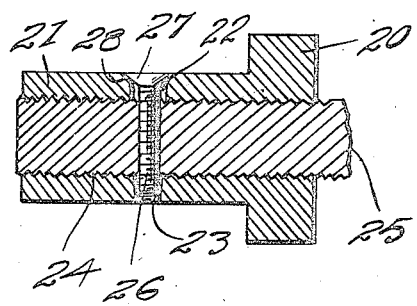
Figure 4:
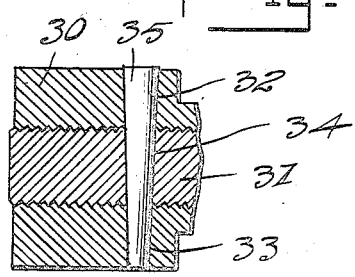

Figure 1 is a side elevation of the improved nut lock, Fig. 2 is a section of the improved nut lock, Fig. 3 is a section of a modified form of the nut lock, and Fig. 4 is a section of still another form of the nut lock.

Referring more particularly to the drawings, 1 designates an ordinary bolt of any suitable structure, which has a screw threaded section 2. A nut 3 is mounted upon the screw threaded section 2 of the bolt, and it has a sleeve 4 secured thereto and extending outwardly from one face of the nut. The sleeve 4 is provided with threads corresponding with the threads of the nut 3, and it is provided for receiving a section of the threaded portion 2 of the bolt 1.

The nut 3 is provided with an opening 5 extending therethrough transversely to the bolt 1, which opening is provided for alinement with an opening 6, extending through the screw threaded shank of the bolt 1. The opening 5 has its upper end countersunk, as shown at 7, for receiving the head 8 of a locking pin 9. The locking pin 9 is externally screw threaded, and its lower end is provided for co-action with the internal screw threads which are formed upon one section of the opening 5, as is shown at 10. The screw threaded section of the opening 5 is positioned upon the opposite side of the bolt receiving opening of the nut, from the section of the opening which has a countersunk outer end 7.

In Figs. 1 and 2 of the drawings, the sleeve 4 is mounted upon the bolt, inwardly of the nut 3, while in the modified form illustrated in Fig. 3 of the drawings, the nut 20 is positioned inwardly toward the head of the bolt, and the sleeve 21 extends outwardly therefrom. The sleeve 21 is provided with a pair of alining openings 22 and 23, which are provided for alinement with an opening 24 formed through the bolt 25. The opening 23, formed in the sleeve 21, is internally screw threaded, and is provided for receiving the end of the locking pin 26, which is externally screw threaded. The locking pin 26 has a head 27 formed thereupon, which is provided for seating in the countersunk portion 28 of the opening 22. The locking pin 26, extending through the openings 22, 24 and 23, will prevent rotation of the sleeve 21 and the nut 20 upon the bolt 25.

In Fig. 4 of the drawings, still another modified form of the invention is shown, which includes a nut 30 and a bolt 31. The nut 30 is provided with openings 32 and 33 formed therein, which aline with each other and with an opening 34 formed in the bolt 31. The openings 32, 33 and 34 are tapered, for receiving a tapered locking pin 35, which is driven therethrough for locking the bolt against rotation upon the nut.

In reducing the invention to practice, certain minor features of construction, combination and arrangement of parts may necessitate alteration, to which the patentee is entitled, provided such alterations are comprehended within the scope of what is claimed.

What is claimed is:—

1. In a nut lock, the combination with a bolt, of a nut, a sleeve formed upon said nut and provided for receiving a section of the screw threaded portion of said bolt, said nut being provided with alining openings extending transversely therethrough, one of said openings being provided with internal screw threads, and a screw threaded locking pin adapted for insertion through said openings and an opening in the bolt for locking the nut upon said bolt.

2. In a nut lock, the combination with a bolt having a screw threaded shank, of a nut for mounting upon said shank, a sleeve formed upon and extending outwardly from one face of said nut and being provided for receiving a section of the screw threaded portion of said shank, said nut being provided with a pair of alining openings, said bolt being provided with a transversely extending opening and adapted for alinement with said nut carried opening, one of said openings formed in said nut being internally screw threaded, the other of said openings having a countersunk outer end, and a screw threaded locking pin extending through said opening for locking said nut against rotation upon said bolt, said locking pin having an enlarged head for seating in the countersunk portion of said opening.

In testimony whereof I affix my signature in presence of two witnesses.

JOHN T. KENNEDY.

Witnesses:
F. M. GODFREY,
FRANK BOTHE.